United States Patent Office 3,243,408
Patented Mar. 29, 1966

3,243,408
STABILIZED POLYOLEFIN COMPOSITIONS
Haig C. Donoian, Dunellen, and Christos Savides, Somerville, N.J., assignors to American Cyanamid Company, New York, N.Y., a corporation of Maine
No Drawing. Filed May 4, 1959, Ser. No. 810,549
7 Claims. (Cl. 260—45.85)

This invention relates to polymeric compositions of matter and more particularly to olefin polymers of the group consisting of polyethylene and polypropylene stabilized against the deteriorating effects of oxygen. In accordance with the present invention, we have discovered that an extremely effective antioxidant suitable for stabilizing polyethylene and polypropylene against deterioration is provided when a two-component stabilizer comprising essentially a 2,6-bis-(2'-hydroxy-3'-tertiary butyl-5'-lower alkylbenzyl)-4-methyl phenol, hereinafter referred to also as "trisphenol" and a thio compound having the formula

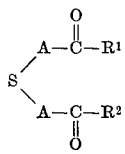

wherein $R^1$ and $R^2$ are substituents selected from the group consisting of —OH,

and —$OR^5$ wherein $R^3$ and $R^4$ are substituents selected from the group consisting of hydrogen and alkyl radicals having 1–6 carbon atoms and $R^5$ is an alkyl radical having from 4–18 carbon atoms, and A is an alkylene radical containing from 1–2 carbon atoms, is blended into the polymer. Each of the components of the stabilizer are known and may be prepared by available procedures. The trisphenols contemplated are characterized by the formula

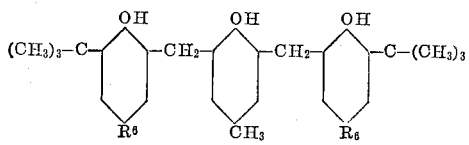

wherein $R^6$ is methyl, ethyl or n-propyl, and may be prepared according to the procedure described in U.S. Patent 2,773,907. The trisphenols included are such as 2,6-bis(2-hydroxy - 3 - tertiary butyl - 5 - methylbenzyl)-4-methyl phenol; 2,6-bis(2-hydroxy-3-tertiary butyl-5-ethylbenzyl)-4-methyl phenol; and 2,6-bis(2-hydroxy-3-tertiary butyl-5-n-propylbenzyl)-4-methyl phenol.

An illustrative procedure for the preparation of the thio compounds, for example, is such as that disclosed in U.S. Patent 2,397,960. In introducing the stabilizer components to the polymer, any procedure that insures thorough mixing into the polyethylene or polypropylene may be utilized. Generally, it is preferred that the trisphenol and the thio compound in a finely divided state be added to the polymer while the polymer is worked on heated rollers. The components of the stabilizer may be added simultaneously or separately, the order of addition generally being immaterial. During the incorporation of the stabilizer components into the polymer, other ingredients such as, for example, fillers, dyes or pigments, waxes and the like compatible with the polymer may be introduced.

We have found in accordance with the invention that by using a combination of a trisphenol and a thio compound, a result is produced which is substantially more superior in inhibiting oxygen deterioration than that if either of the individual components were added in a like amount. As a matter of fact, it has been found that no significant improvement in antioxidant characteristics is produced when a thio compound of the formula alone is used. The trisphenols are known to inhibit deterioration caused by the effects of oxygen. However, a very substantial improvement in stabilization is produced, which is synergistic in nature, when the trisphenols are combined with the thio compounds. By use of combined agents, not only is the antioxidant activity greatly increased, but also a definite color improvement is obtained. Thio compounds of the above general formula include such as 3,3'-thiodipropionic acid; 3,3'-thiodipropionamide and N-lower alkyl mono- and di-substituted thioamides; alkyl esters of 3,3'-thiodipropionic acid, where the alkyl group has 4–18 carbon atoms, such as dibutyl, diamyl, dihexyl, dioctyl, diisooctyl, di-2-ethylhexyl, di-dodecyl, dilauryl, distearyl, and the like esters of thiodipropionic acid, as well as 2,2'-thiodiacetic acid and the derivatives corresponding to those described for the 3,3'-thiodipropionic acid such as N-lower alkyl mono- and di-substituted thioamides, alkyl esters of these thio dialkyl acids and the like.

The amount of combined stabilizer required in the composition of the invention depends upon the activity of the particular stabilizer used and upon the conditions under which the polymeric material is to be processed, or to which it is to be exposed. Except under extreme circumstances, the components of the stabilizer, each in amounts of from 0.001% and not more than 4%, are generally satisfactory, although amounts not in excess of 2% are suitable for most purposes. Amounts of each of the components of between 0.05% and 1%, based on the weight of the polymeric composition, constitute the preferred range. If desired, in the process of using the stabilizer, a master batch of polymeric material containing amounts of up to about 25% of the total weight of the stabilizer, may be prepared and this fed into the polymer as it is processed in order to more accurately regulate the amounts introduced and to facilitate homogeneous distribution of the stabilizer into the polymer. It is generally desirable to employ at least about 0.25 part of the thio compound for each part of the trisphenol; although satisfactory results are obtained when from about 0.05 to 5 parts of the thio compound, based on the trisphenol, is used. In addition to the synergistic effect of stabilization against deterioration by use of the combined stabilizer over use of the trisphenols alone, it is noted that the objectionable color which forms when a phenolic type antioxidant is used alone is also eliminated. The compositions of the present invention, because they retain their freedom from objectionable discoloration, are particularly advantageous for use in making articles of a clear color or light pastel shade.

In order that the present invention may be more fully understood the following examples are set forth for the purpose of illustration only, and any specific enumeration of details should not be interpreted as a limitation, except as expressed in the appended claims.

The preferable procedure, as illustrated in the examples which follow, is to blend the ingredients in powdered form with the assistance of heat and pressure to facilitate the homogeneous distribution.

Unstabilized commercially available polypropylene powder characterized by having a melt index of 34.7 [1] is milled on a two-roll mill, with the front roll at 320° F. and the back roll at 375° F. 100 grams of polypropylene ---
[1] Melt index (M.I.) is determined acording to ASTM procedure D1238–52T modified by using 10 kg. load instead of 2.16 kg.

powder are first fluxed on the mill, then the antioxidant is added, and the mixture fluxed for 4 to 5 minutes (35 to 40 passes). The plastic is then molded into films 0.015 to .003 inch at 120 p.s.i. (about 370° F.). A weighed sample is placed in an aluminum boat in an enclosed oxygen atmosphere at 140° C. This enclosed oxygen atmosphere is connected to a gas buret with a mercury leveling device for periodically adjusting the atmosphere to a constant pressure. The amount of oxygen taken up by the plastic is read from the gas buret and reported at several time intervals. The data set forth in Table I below using the above blending conditions are reported in two ways: (1) hours to absorb 10 milliliters of oxygen per gram of resin and (2) induction period in hours.[2] The induction period is determined by first plotting the volume of oxygen absorbed versus time. Very little oxygen is absorbed at first, then the rate of absorption is increased rapidly. By extrapolating the steep portion of this oxygen uptake curve back to zero volume of oxygen uptake, the induction period is determined.

TABLE I

*Combinations with trisphenol in polypropylene*

| Ex. | Additive and Amount Based on Polymer | Oxygen Uptake at 140° C. | |
|---|---|---|---|
| | | Induction Period (Hrs.) | Time to absorb 10 cc. O₂/g. Resin (Hrs.) |
| 1 | Control (unstabilized polypropylene—melt index 34.7). | 0.4 | 0.5 |
| 2 | 0.1% trisphenol (3 samples) | 22 | 16 |
| 3 | 0.2% 3-thiopentanedioic acid (thiodiacetic acid). | 0.5 | 0.7 |
| 4 | 0.1% 3-thiopentanedioic acid (thiodiacetic acid) + 0.1% trisphenol. | 76.0 | 70.3 |
| 5 | 0.2% 3,3'-thiodipropionic acid | 0.6 | 0.8 |
| 6 | 0.1% trisphenol + 0.1% thiodipropionic acid. | 53 | 54 |
| 7 | 0.2% dilauryl 3,3'-thiodipropionate | 0.5 | 0.5 |
| 8 | 0.1% dilauryl 3,3'-thiodipropionate + 0.1% trisphenol. | 28 | 27 |
| 9 | 0.1% trisphenol and 0.035% 3,3'-thiodipropionic acid. | 43 | 43 |
| 10 | 0.1% trisphenol and 0.20% 3,3'-thiodipropionic acid. | 51 | 52 |
| 11 | 0.2% 3,3'-thiodipropionamide | 0.3 | 0.3 |
| 12 | 0.1% trisphenol and 0.1% 3,3'-thiodipropionamide. | 46 | 44 |

The following examples, in which a different commercially obtainable polypropylene (having a melt index of 3.86) is employed, gave results as follows:

| Ex. | Additive in Polypropylene | Oxygen Uptake at 140° C. | |
|---|---|---|---|
| | | Induction Period (Hrs.) | Time to absorb 10 cc. O²/g. Resin (Hrs.) |
| 13 | Control | 0.3 | 0.4 |
| 14 | 0.1% trisphenol | 6.5 | 5.0 |
| 15 | 0.2% 3,3'-thiodipropionic acid | 0.5 | 0.5 |
| 16 | 0.1% trisphenol and 0.1% 3,3'-thiodipropionic acid. | 22 | 31 |

Results obtained with polyethylene using essentially the same procedure as described in connection with polypropylene are set forth in Table II.

---

[2] The absorption of oxygen by polyolefins is a direct indication of oxidation. Much of the oxygen so absorbed is converted into carbonyl groups in the polymer. The reaction is believed to be a free radical chain reaction which consumes oxygen. The embrittlement which also takes place during the oxidation is one of the terminal steps of the free radical reaction chain. The reaction is slow at first, but the free radicals multiply and eventually the number of chain reactions (or free radicals) becomes great enough so that the absorption of oxygen becomes measurable. The period of reaction before the oxygen uptake is measurable is called the induction period.

TABLE II

*Combinations of thio compounds with trisphenol in polyethylene*

Samples=8-10 mil films, milled and molded
Specimen: ~⅜"×2½" strip, ~0.2 gram
Melt Index of polyethylene=1.64

| Ex. | Additive and Amount Based on Polymer | Oxygen Uptake at 140° C. | |
|---|---|---|---|
| | | Induction Period (Hrs.) | Time to absorb 10 cc. O₂/g. Resin (Hrs.) |
| 17 | Control (no additive) | 2.7 | 3.6 |
| 18 | 0.01% trisphenol | 112.5 | 114.0 |
| 19 | 0.025% trisphenol | 167.0 | 163.7 |
| 20 | 0.050% trisphenol | 184.0 | 184.0 |
| 21 | 0.100% trisphenol | 204.0 | 197.0 |
| 22 | 0.1% 3,3'-thiodipropionamide | 3.0 | 3.7 |
| 23 | 0.1% 3,3'-thiodipropionamide + 0.025% trisphenol. | 264.0 | 265.0 |
| 24 | 0.1% dilauryl-3,3'-thiodipropionate | 18.0 | 15.3 |
| 25 | 0.1% dilauryl-3,3'-thiodipropionate + 0.025% trisphenol. | 496.0 | 483.0 |

The six runs in the following table show comparative percentage elongation until failure of samples. The results are indicative of the improved deterioration resistance of the polymer containing the combination stabilizer of a trisphenol and a thio compound over unstabilized as well as commercially obtained stabilized polymer.

A heat treatment as previously described was run on the following and sample test bars (average of 5) were examined. In Run 26 unstabilized propylene was examined. In Run 27 the unstabilized polymer of Run 26 is blended with 0.2% of dilaurylthiodipropionate (DLTDP) and 0.2% of 2,6-bis(2-hydroxy-3 - tertiary butyl-5 - methylbenzyl)-p-cresol (BHTB). Run 28 is made on a commercially available stabilized polypropylene having a melt index of 34.7. Run 29 is made on test pieces of the composition of Run 28 containing blended therein 0.2% DLTDP and 0.2% BHTB. Run 30 like Run 28 is made on a stabilized material obtained from a different commercial source (melt index 3.86) and Run 31 comprises the composition of Run 30 containing blended therein 0.2% DLTDP and 0.2% BHTB.

| Example | Elongation, percent, after Days at 104° C. | | | | | |
|---|---|---|---|---|---|---|
| | 0 | 7 | 14 | 21 | 28 | 35 |
| 26 | 18 | 3 | 2 | (¹) | (¹) | (¹) |
| 27 | 62 | 24 | 24 | 25 | 27 | 27 |
| 28 | 20 | 25 | 26 | 7 | (¹) | (¹) |
| 29 | 21 | 27 | 27 | 28 | 30 | 27 |
| 30 | 39 | 35 | 36 | 34 | 34 | 35 |
| 31 | 61 | 46 | 46 | 42 | 46 | 52 |

¹ Specimen deteriorated beyond testable condition.

We claim:
1. A composition comprising a polyolefin selected from the group consisting of polyethylene and polypropylene and a two-component stabilizer therefor consisting essentially of (I) from about 0.001% to about 4% of 2,6-bis (2' - hydroxy - 3' - tertiary butyl - 5' - lower alkylbenzyl) 4-methyl phenol and (II) from about 0.001% to about 4% of a thio compound having the formula

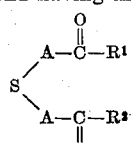

wherein R¹ and R³ are substituents selected from the group consisting of —OH and

wherein $R^3$ and $R^4$ are substituents selected from the group consisting of hydrogen and alkyl radicals having 1–6 carbon atoms and A is an alkylene radical having 1–2 carbon atoms.

2. A composition comprising a polyolefin selected from the group consisting of polyethylene and polypropylene and a two-component stabilizer therefor consisting essentially of (I) from about 0.001% to about 4% of 2,6-bis (2 - hydroxy - 3 - tertiary butyl - 5 - methylbenzyl)-4-methyl phenol and (II) from about 0.001% to about 4% of a thio compound having the formula

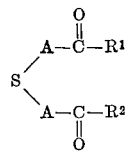

wherein $R^1$ and $R^2$ are substituents selected from the group consisting of —OH and

wherein $R^3$ and $R^4$ are substituents selected from the group consisting of hydrogen and alkyl radicals having 1–6 carbon atoms and A is an alkylene radical having 1–2 carbon atoms.

3. A composition comprising a polyolefin selected from the group consisting of polyethylene and polypropylene and a two-component stabilizer therefor consisting essentially of (I) from about 0.001% to about 4% of 2,6-bis (2 - hydroxy - 3 - tertiary butyl - 5 - methylbenzyl)-4-methyl phenol and (II) from about 0.001% to about 4% of thiodipropionic acid.

4. A composition comprising polyethylene and a two-component stabilizer therefor consisting essentially of (I) from about 0.005% to about 5% of 2,6-bis(2-hydroxy-3-tertiary butyl-5-methylbenzyl)-4 - methyl phenol and (II) from about 0.001% to about 4% of 3,3-thiodipropionic acid.

5. A composition comprising polypropylene and a two-component stabilizer therefor consisting essentially of (I) from about 0.001% to about 4% of 2,6-bis(2-hydroxy-3-tertiary butyl-5-methylbenzyl)-4-methyl phenol and (II) from about 0.001% to about 4% of 3,3'-thiodipropionic acid.

6. A composition comprising a polyolefin selected from the group consisting of polyethylene and polypropylene and a two-component stabilizer therefor consisting essentially of (I) from about 0.001% to about 4% of 2,6-bis (2'-hydroxy-3'-tertiary butyl-5'-lower alkylbenzyl) 4 methyl phenol and (II) from about 0.001% to about 4% of a thio compound having the formula

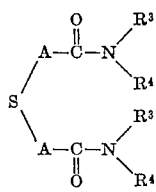

wherein $R^3$ and $R^4$ are members of the group consisting of hydrogen and alkyl radicals having 1–6 carbon atoms and A is an alkylene radical having 1–2 carbon atoms.

7. A method of stabilizing a polyolefin selected from the group consisting of polyethylene and polypropylene which comprises intimately blending into said polymer until a homogeneous composition is obtained, a two-component stabilizer consisting essentially of from about 0.001% to about 4% of 2,6-bis(2'-hydroxy-3' - tertiary butyl-5'-lower alkylbenzyl)-4-methyl phenol and from about 0.001% to about 4% of a thio compound having the formula

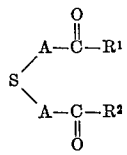

wherein $R^1$ and $R^2$ are substituents selected from the group consisting of —OH and

wherein $R^3$ and $R^4$ are substituents selected from the group consisting of hydrogen and alkyl radicals having 1–6 carbon atoms, and A is an alkylene radical having 1–2 carbon atoms.

References Cited by the Examiner
UNITED STATES PATENTS 2,519,755  8/1950  Gribbins _____ 260—45.85

FOREIGN PATENTS 758,973  10/1956  Great Britain.

LEON J. BERCOVITZ, *Primary Examiner.*

A. M. BOETTCHER, A. D. SULLIVAN, *Examiners.*

S. H. BLECH, H. LEVINE, H. TAYLOR,
*Assistant Examiners.*